April 13, 1954  H. A. SAROFF ET AL  2,675,349
DIFFUSION APPARATUS Filed Jan. 4, 1952  4 Sheets-Sheet 1

Inventors
Harry A. Saroff and
George H. L. Dillard
By Beale and Jones
Attorneys

April 13, 1954 H. A. SAROFF ET AL 2,675,349
DIFFUSION APPARATUS
Filed Jan. 4, 1952 4 Sheets-Sheet 2

Inventors
Harry A. Saroff
George H. L. Dillard
By Beale and Jones
Attorneys

Patented Apr. 13, 1954

2,675,349

UNITED STATES PATENT OFFICE 2,675,349

DIFFUSION APPARATUS

Harry A. Saroff, Bethesda, and George H. L. Dillard, Rockville, Md.

Application January 4, 1952, Serial No. 264,894

8 Claims. (Cl. 210—8.5)

This invention relates to a diffusion apparatus for continuous dialysis of solutions or molecular rectification and to a method for continuously dialyzing large amounts of solutions.

There are many commercial applications of dialysis in connection with the recovery of expensive reagents or the processing of biological solutions. The equipment heretofore available to carry out these processes, particularly in the continuous dialysis of large amounts of solutions, has been very expensive and relatively inefficient due to limitations imposed upon the design of the equipment by the properties of available dialyzing membranes.

The foregoing objections have been overcome by this invention which comprises a membrane diffusion unit apparatus; and, in its preferred embodiment, a membrane diffusion column composed of a plurality of membrane diffusion units which are applicable to the continuous separation of dissolved molecules by means of their differences in diffusion rates. The membrane diffusion apparatus of this invention comprises, basically, a dialyzing membrane supported at an acute angle with respect to the horizontal with one end of the membrane thus elevated above the other end thereof. The dialyzing membrane is supported in this position in a manner such that it is wholly flat or plane. The solution to be subjected to dialysis is allowed to drip upon the upper surface of the membrane at the elevated end thereof and flow by gravity thereover to the lowermost end of the membrane. The solution, when thus applied to the upper surface of the dialyzing membrane, spreads transversely across the upper surface of the membrane and flows in a fairly uniform thin film of liquid having a thickness of the order of about 0.1 mm., toward the lower end of the membrane. This film of liquid has been found to be composed of an extremely thin film or region of liquid adjacent the dialyzing membrane which moves at a slow speed with laminar flow with the balance of the liquid flowing over this film at a greater speed in a turbulent manner. The provision of a turbulent region in the flowing film of liquid is an important feature of this invention since it prevents the larger molecules in the solution from becoming concentrated adjacent the upper surface of the membrane and the thin film thereupon wherein there is laminar flow.

The wash liquid is applied to the lower face of the dialyzing membrane at the elevated end thereof and allowed to flow by gravity to the lower end of the membrane. The flow characteristics of this liquid film are substantially the same as those of the film of liquid flowing over the upper surface of the membrane. Thus, the flowing film of wash solution includes a thin film adjacent the membrane which moves at a slow speed with laminar flow while the balance of liquid flows thereover at a greater speed with turbulence. At the lower end of the dialyzing membrane means are provided at the upper surface thereof to withdraw the solution which has been dialyzed and means are also provided adjacent the lower surface of the membrane to withdraw the wash liquid. The solution which has been subjected to dialysis may, if desired, be introduced into a second membrane diffusion unit and again subjected to dialysis. A multiple surface system may be achieved merely by using a plurality of these units in series. The above membrane diffusion unit is operated under conditions where either only the smaller molecules in the solution subjected to dialysis have time to diffuse in relatively large amounts or the membrane becomes a barrier to the large molecules in solution. Either the above unit or a column composed of a plurality of these units becomes a continuous dialyzer.

It is, therefore, the principal object of this invention to provide a diffusion apparatus wherein a liquid containing dissolved molecules is permitted to flow by gravity in a thin film over the upper surface of a plane inclined dialyzing membrane and a wash liquid is permitted to flow by gravity in a thin film over the lower surface of the membrane.

Another object of this invention is to provide a diffusion apparatus employing a plane inclined dialyzing membrane, a means at the uppermost end of the membrane for depositing a solution to be processed upon the upper surface thereof, and a means for depositing a wash liquid to the lower surface of the membrane at the uppermost end thereof, each of said liquids thereafter being permitted to flow over the respective surfaces of the membrane by means of gravity to the lowermost end thereof.

Another object of this invention is to provide a diffusion apparatus having a plane inclined dialyzing membrane wherein liquids may flow by gravity over the upper and lower surfaces thereof as films, each of which films is composed of a thin film adjacent the surface of the membrane which moves at a slow speed with laminar flow while the remainder of the liquid in the film flows at a greater speed with turbulence.

A further object of this invention is to provide a diffusion column for continuous separation of dissolved molecules having a plurality of plane inclined dialyzing membranes supported therein and having means for depositing liquids upon and removing liquids from the upper and lower surfaces of the membranes.

Still another object of this invention is to provide a diffusion column for continuous separation of dissolved molecules comprising a spaced pair of vertically disposed frames, each having a plurality of horizontally disposed supporting members mounted therein, the supporting members in one of the frames being staggered with respect to those in the other frame, a dialyzing membrane extending over the supporting members between the frames to provide a vertically extending zigzag membrane, means for depositing liquids to the upper and lower surfaces of the membrane and means for withdrawing liquids from the upper and lower surfaces thereof.

It is also an object of this invention to provide a diffusion column for continuous separation of dissolved molecules which is compact and inexpensive to construct, and which operates efficiently.

The above and other objects of this invention will be apparent from the following detailed description and the accompanying drawings wherein:

Figures 1, 2:
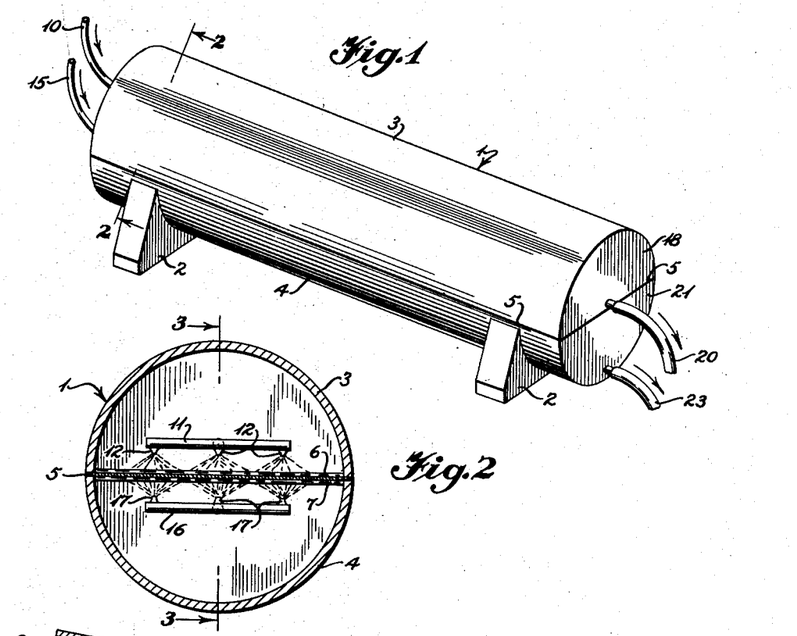
Figure 1 is a perspective view of a membrane diffusion unit apparatus which embodies the basic novel features of this invention.
Figure 2 is an end view in cross section taken along line 2—2 of Figure 1.
Figure 3:
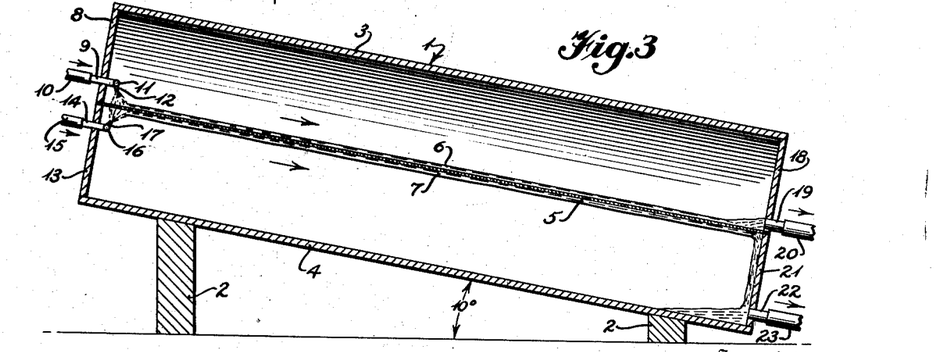
Figure 3 is a side elevational view in cross section taken along line 3—3 of Figure 2.

Referring to the drawings in detail the basic features of this invention may be embodied in the simplified form of membrane diffusion apparatus comprising the unit shown in Figures 1 to 3 of the drawings. The unit diffusion apparatus shown in these figures consists of a chamber generally designated by the numeral 1 supported by base member 2—2. The chamber 1 which may be formed of a transparent synthetic resinous material is composed of upper and lower sections 3 and 4 respectively. A dialyzing membrane 5 is positioned between the abutting faces of the upper and lower sections 3 and 4 of the chamber 1 and is secured therebetween in a manner such that the membrane is free of wrinkles and is completely flat throughout the entire extent thereof. The dialyzing membrane is thus provided with upper and lower surfaces 6 and 7, respectively, which are plane surfaces. All four edges of the membrane 5 may be placed under tension in this form of the invention and any tendency thereof to sag is thus eliminated.

The chamber 1 is tilted or inclined with respect to the horizontal as is shown in Figure 3. The position of the chamber is, however, not important, it only being essential that the dialyzing membrane 5 supported therein be inclined at an acute angle with respect to the horizontal. The angle of inclination disclosed in Figure 3 is approximately 10° but this may be varied depending upon factors which will be discussed hereinbelow.

The elevated end 8 of the upper section 3 of the chamber 1 is provided with an opening through which a fluid conduit 9 may extend. The outer end of the conduit 9 is connected to a fluid supply pipe 10 which is connected to a reservoir of a liquid to be subjected to dialysis. The inner end of the conduit 9 is connected to a manifold 11 which is provided with a plurality of fluid outlets 12 positioned immediately above the upper surface of the membrane 5 at the elevated end thereof. The elevated end 13 of the lower section 4 of the chamber is similarly provided with an opening adapted to receive a liquid conduit 14 which is attached to a fluid supply pipe 15 that is connected to a supply of wash water. The inner end of the conduit 14 is connected to a manifold 16 which is provided with a plurality of fluid outlets 17. These outlets are positioned immediately below the lower surface of the membrane 5 at the elevated end thereof.

The lower end 18 of the upper section 3 of the chamber 1 is provided with an opening adjacent the upper surface of the membrane 5 which opening is adapted to receive a conduit 19. The conduit 19 is connected to an outlet pipe 20 which may lead to a collecting receptacle which is not shown or to the conduit 9 of an adjacent membrane diffusion unit, if several such units are employed in series. The lower end 21 is provided with an opening which is adapted to receive a conduit 22 that is connected to an outlet pipe 23. The latter may be connected to a drain or other means for disposing of the used wash water.

The dialyzing membrane 5 employed in the diffusion unit shown in Figures 1 to 3 may be formed of any of the materials commonly used for dialyzing purposes. The membrane may be formed of fibrous or non-fibrous wettable materials as a class. The non-fibrous materials include films of such materials, as for example, cellulose hydrate, alkali-soluble cellulose ethers, cellulose esters, mixed ester-ethers of cellulose, gelatin, casein, permeable and semi-permeable resins, porous glass and the like. The cellulose ethers may comprise the alkyl ethers, the hydroxy-alkyl ethers, the carboxy-alkyl ethers, and the mixed ethers such as alkyl hydroxy-alkyl cellulose ethers and the cellulose ether xanthates. The cellulose esters which may be used include films formed of low nitrated cellulose nitrate, low esterified cellulose acetate and cellulose formate. The cellulose hydrate may be regenerated from viscose or from cupraammonium solutions of cellulose. Among the film of solvent swelling resins which may be used are those formed from permeable and semi-permeable polymers of acrylic acid, methyl methacrylate and polyvinyl alcohol resins in the "A" stage. Wettable fibrous materials include parchment paper, glass fiber cloth and the like. It is preferred to employ films of cellulose hydrate; such as, for example DuPont "600PT" having a thickness of 0.0016" when dry or Visking sausage casing having a thickness of 0.00155" when dry.

The dialyzing membrance 5 is moistened and care taken to prevent any deposition of oil or grease upon the surfaces thereof. The membrane is then stretched, levelled and secured between the sections of chamber 1. The liquid to be subjected to dialysis is then deposited through the outlets 12 by gravity only upon the upper surface 6 of the membrane 5 at the elevated end thereof. The liquid spreads laterally over the upper surface 6 and flows thereover toward the lower end of the membrane 5 by gravity as a thin film having a thickness of the order of 0.1 mm. This film of flowing liquid is composed of a thin film adjacent the surface 6 of the membrane which moves at slow speed. The character of the flow in this thin film is laminar. The remainder of the flowing liquid thereabove moves with greater speed in a turbulent manner. In the turbulent portion of the flowing film of liquid the solution circulates in a direction normal to the membrane 5 with the result that there is no concentration gradient of the larger molecules adjacent the portion of the film flowing in a laminar manner.

The wash water is deposited upon the lower face 7 of the membrane 5 at the upper end thereof by the outlets 17. The wash water spreads over the surface of the membrane 5 and flows, by gravity, toward the lower end of the membrane as a thin film. This film is composed of a portion adjacent the membrane 5 which flows at slow speed in a laminar manner while the remainder of the film moves with greater speed in a turbulent manner. As the films flow over the upper and lower surfaces 6 and 7 of the membrane, the molecules having the greatest rate of diffusion migrate through the laminar flowing portion of the film adjacent the upper surface 6 and the membrane 5 into the thin film of wash water flowing over the lower surface 7 of the membrane. When the film of liquid flowing over the upper surface 6 of membrane reaches the lower end thereof it is removed therefrom through the conduit 19 and the outlet pipe 20. The wash water flowing on the lower surface 7 of the membrane flows over the inner surface of the lower end 21 of the section 4 of the chamber and is withdrawn therefrom through the conduit 22 and the outlet pipe 23.

In one experiment with the diffusion unit described above a solution of 0.1M sodium chloride was permitted to flow at a rate of 5 ml. per minute over the upper surface 6 of a membrane 5 having an area of 50 square inches. Wash water was permitted to flow over the lower surface 7 of the membrane at the rate of 150 ml. per minute. Under these conditions 30 percent of the salt was removed in a single traverse.

Figures 4, 5:
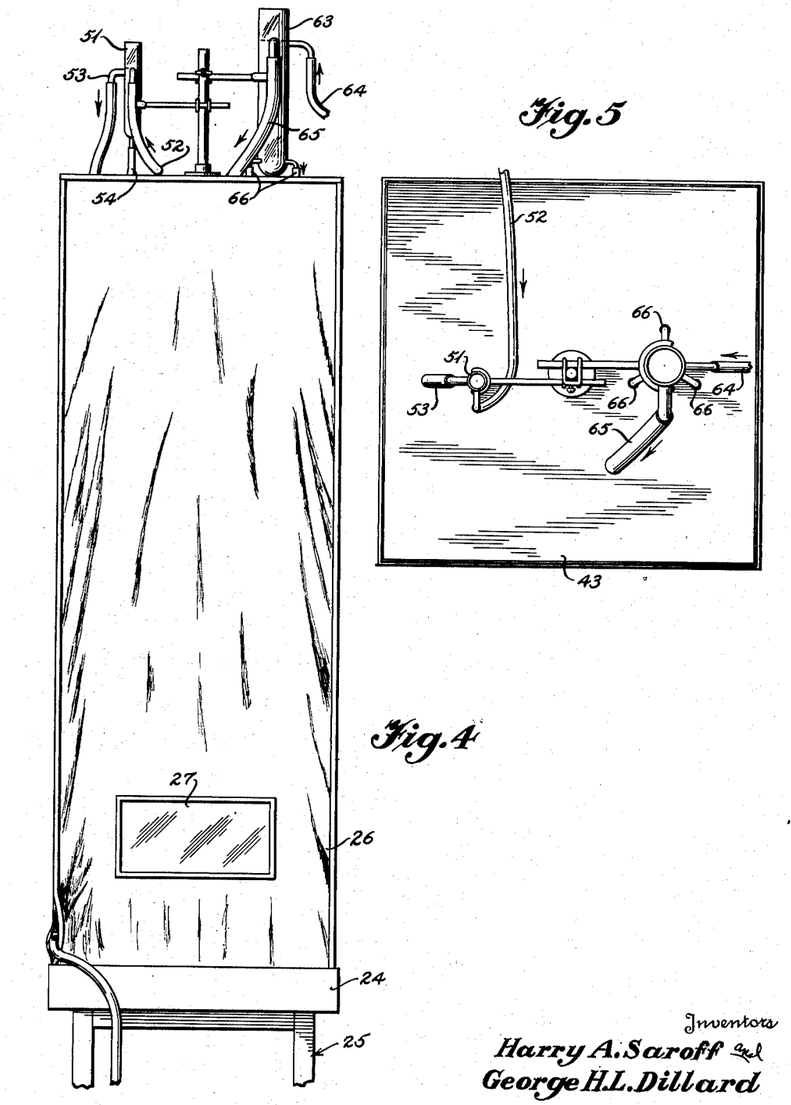
Figure 4 is a side elevational view of a diffusion column comprising the preferred embodiment of this invention showing the column enclosed in a moisture-proof cover.
Figure 5 is a top plan view of the column shown in Figure 4.
Figures 6, 7, 8, 9:
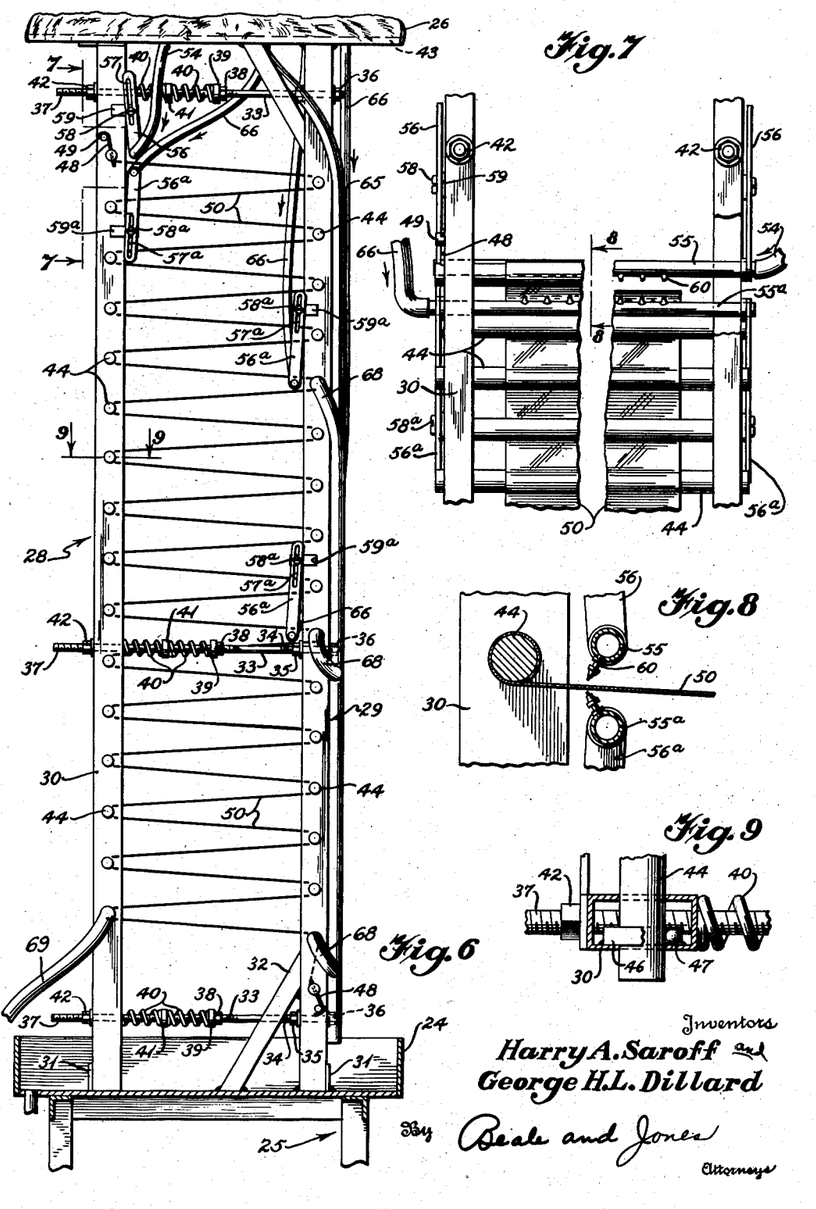
Figure 6 is a side elevational view of the diffusion column shown in Figure 4 with the moisture-proof cover removed.
Figure 7 is an enlarged end elevational view, partly in cross section taken along line 7—7 of Figure 6 and broken to conserve space, showing a portion of the diffusion column adjacent the top thereof.
Figure 8 is an enlarged fragmentary view in cross section taken along line 8—8 of Figure 7 showing the top plane inclined dialyzing membrane in the diffusion column and the means for depositing liquids to the surfaces thereof.
Figure 9 is an enlarged fragmentary top view in cross section taken along line 9—9 of Figure 6 showing the means for mounting a membrane support in the frame of the diffusion column.

The basic principles of the diffusion apparatus of this invention have been utilized in a compactly arranged diffusion column adapted for use in continuous dialysis of large amounts of solutions as well as in the simplified diffusion unit shown in Figures 1 to 3. The diffusion column shown in Figure 4 is mounted in a collecting basin 24 which rests upon a support 25. The diffusion column is enclosed in a moisture-proof cover 26 provided with window 27 which permits observation of the column when it is in operation. The cover 26 is employed for the purpose of providing a chamber for the diffusion column in order that the air therein may be kept saturated with moisture. The operation of the diffusion column is enhanced by maintaining the air therearound saturated with liquid. The diffusion column is more clearly shown in Figure 6 with the moisture-proof cover 26 raised to the top of the column. The diffusion column is composed of a pair of spaced frames indicated generally as 28 and 29 each of which frames consist of two upwardly extending square hollow posts 30 which, of course, may have any other desired shape. The lowermost ends of each post 30 in each of the frames 28 and 29 are connected by plate members 31, and the lower ends of the posts 30 and the plates 31 of the frame 29 may be welded as shown or otherwise secured to the collecting basin 24. The frame 28 is, therefore, free to be moved toward or away from the frame 29. The frame 29 may also be further supported by the angularly disposed bars 32 which may be secured at one end to the frame as shown in Figure 6 and welded, at the other end thereof, to the collecting basin 24. The opposed posts 30 in each of the frames 28 and 29 are provided with apertures which are aligned to receive tensioning rods 33. The tensioning rods 33 thus extend through aligned apertures in opposed posts 30 and are positioned horizontally. The rods 33 are provided with threads 34 at one end which are adapted to receive nuts 35 and 36 with washers which engage opposite faces of the posts 30 in the right-hand frame 29. The rods 33 are thus firmly secured to the posts 30 in the right-hand frame 29 and no relative movement between the posts and the rods may occur. The opposite ends of the rods 33 are provided with threads 37 which extend a substantial distance along the length of the rod. In assembling the frames 28 and 29 a nut 38 and washer 39 may be placed upon each of the rods 33 before the ends of latter are inserted in the apertures provided in the left-hand frame 28. At the same time two coiled springs 40 separated from one another by a washer 41 may be placed upon each reinforcing rod 33. After the nuts 38 with their washers 39 and the coiled springs 40 have been positioned on each tensioning rod 33, the end of the rod is inserted in an aperture provided in the posts 30 of the left-hand frame 28. A nut 42 and washer is then placed upon the end of each rod 33 projecting from the posts 30 and this nut is then tightened until the opposed posts 30 in the right and left-hand frames 28 and 29 have moved on the rods 33 until they are parallel. When the frames 28 and 29 have thus been positioned so that they are parallel to one another the nuts 38 may be tightened on each of the rods 33. The coil springs 40 are thus placed under compression and will oppose and overcome any force exerted upon the frames 28 and 29 tending to move these frames toward one another.

The diffusion column is provided with metal top 43 which is secured to the uppermost ends of the posts 30 of the frame 29 by means of welded joints as shown or any other desired means. The metal top 43 overhangs the diffusion column along all four sides thereof and the moisture-proof cover 26 which is secured to the edges of the top 43 thus is spaced from the sides of the column when the cover is lowered to enclose the diffusion column. The top 43 only rests upon the frame 28 which may, therefore, be moved toward and away from the frame 29.

The upwardly extending posts 30 in the left-hand frame 28 are provided with a plurality of apertures throughout the length thereof, the apertures in each post being aligned with those in the other post. A dialyzing membrane support 44 or a tube 45 provided with an opening in the sidewall thereof for removing liquid from a surface of the dialyzing membrane are rotatably mounted in the aligned pairs of apertures. The membrane supports 44 are positioned horizontally and are parallel to one another. The ends of the supports 44 project outwardly from the face of each of the posts 30 through which they extend. Each of the membrane supports 44 is mounted in a journal consisting of collar 46 which encloses a plurality of roller bearings 47 as is shown in detail in Figure 9. The uppermost membrane support 44 positioned at the top of the left-hand frame 28 is provided with a transversely extending aperture adjacent the outermost ends of the support which is adapted to receive a spring lever 48. The lever 48 may be employed to rotate the membrane support to which it is attached and the position of the lever and the support may be secured against rotation by engaging the lever 48 with a lug 49 mounted on each outer face of the posts 33 near the uppermost ends thereof. The upwardly extending posts 30 in the right-hand frame 29 are likewise provided with a plurality of aligned apertures throughout the length thereof which are also adapted to receive either a dialyzing membrane support 44 or a solution stripping tube 45. Each pair of aligned apertures in the frame 29 are offset or staggered with respect to the aligned apertures in the left-hand frame 28. It will thus be apparent that the membrane supports 44 in each of the frames 28 and 29 are each vertically displaced with respect to the nearest membrane supports 44 in the opposite frame. The membrane supports 44 are rotatably mounted in the right-hand frame 29 by means of the journals mounted on the posts 30 of this frame. These journals are identical to those shown in Figure 9 which are employed in the left-hand frame 28. The lowermost membrane support 44 located near the lower ends of the posts 30 in the right-hand frame 29 are transversely apertured adjacent the ends thereof to receive spring levers 48. As previously described, the levers 48 may be used to rotate the support 44 to which it is attached and the lever may be locked by permitting it to engage the lugs 49 mounted on the outer faces of the posts 30 in the frame 29.

A dialyzing membrane 50 formed of any of the fibrous or non-fibrous wettable organic and inorganic materials described hereinabove is placed upon the membrane supports 44 in the frames 28 and 29. The membrane is first thoroughly wetted and washed to avoid any contamination thereof with fat or grease. One end of the membrane 50 is then wound about the support 44 located at the top of the left-hand frame 28 until it engages this membrane support firmly as is shown in detail in Figure 8. The membrane 50 is then threaded over the upper membrane support 44 at the top of the right-hand frame 29 and is then threaded from the lower side of the latter support across the diffusion column and over the next lower membrane support 44 in the left-hand frame 28. The operation described is continued throughout the entire height of the diffusion column until the membrane 50 rests upon each support 44 in each of the frames 28 and 29 to provide a continuous membrane arranged in a zigzag manner. The terminal end of the membrane 50 at lower end of the diffusion column is preferably led from a combined membrane support and liquid stripping tube adjacent the lower end of the right-hand frame 29 to the lowermost membrane support 44 in the frame 29 where it is wound thereupon until it firmly engages the surface of this support. When the membrane 50 has been arranged in the vertically disposed sinuous manner described the spring levers 48 at the top and bottom of the frames 28 and 29, respectively may be rotated. The membrane supports 44 to which levers 48 are attached are rotated, in turn, and the entire membrane is stretched as the terminal ends thereof are taken up on the rotating supports. Each of the intermediate supports 44 or 45 are free to rotate and, therefore, the tension placed upon the terminal ends of the membrane 50 is distributed as uniformly as possible throughout the length of the membrane. When the membrane is thus stretched each section thereof extending between opposite supports in the spaced frames is flat and is inclined at an acute angle with respect to the horizontal. The angle of the membranes shown in Figure 6 is about 23½°.

Figure 13:
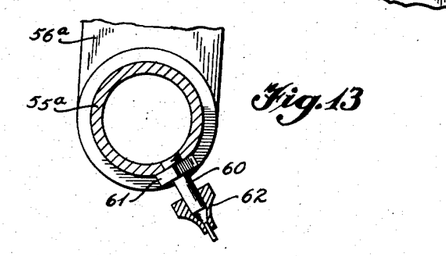
Figure 13 is an enlarged fragmentary view partly in cross section of a manifold for depositing liquid upon a surface of the dialyzing membrane.

The solution to be subjected to dialysis is supplied to the diffusion column by a constant head reservoir 51 mounted upon the metal top 43. The solution is fed to the reservoir 51 by a supply pipe 52 and a constant head is maintained in the reservoir 51 by providing an overflow pipe 53. The solution is fed from the bottom of the reservoir 51 through a conduit 54. The conduit 54 extends through an aperture provided in the top 43 into the diffusion column where it is connected to a manifold 55. The manifold 55 is supported by rotatable sliding brackets 56 each being provided with an elongated slot 57 through which a locking screw 58 extends which is received in a drilled and tapped opening provided in a lug 59 that is mounted on the outer faces of the posts 30 in the left-hand frame 28. The manifold 55 is provided with a plurality of drilled and tapped openings in the sidewall thereof which are adapted to receive the outlet pipes 60. The manifold 55 is provided with about fifteen such outlets spaced about an inch apart. The outlet pipes may be secured in the manifold 55 by the lock nuts 61 shown in Figure 13. The ends of the outlet pipes 60 are threaded to receive interchangeable cannulae 62 which permits the use of cannulae of different sizes. Interchangeable cannulae, in conjunction with different heads of fluid in the reservoir 51 makes it possible to vary the rate of flow of the liquid to be subjected to dialysis within desired limits. The position of the manifold 55 and the distance of the outlet pipes 60 from the surface of the membrane 50 may be varied by loosening the screw 58 and moving the bracket 58. The bracket 58 may also be rotated to vary the angle of the interchangeable cannulae 62 with respect to the surface of the membrane 50.

The wash water employed in the diffusion column of this invention is supplied at a constant head from a reservoir 63 mounted upon the top 43 of the diffusion column. The reservoir 63 is supplied by a pipe 64 and is provided with an overflow pipe 65. A plurality of conduits 66 are connected to the bottom of the reservoir 63 to feed wash water therefrom. The conduits 66 pass through apertures provided in the top 43 into the diffusion column and are each connected to a manifold 55a. One of the manifolds 55a is supported immediately beneath the lower surface of the membrane 50 adjacent the terminal end thereof secured to the uppermost membrane support 44 in the left-hand frame 28. This manifold is supported by rotatable and sliding brackets 56a which are locked by screws 58a to lugs 59a mounted on the outer faces of the posts 30 of the left-hand frame 28. The screws 58a extend through slots 57a provided in the brackets 56a and these may be loosened to permit adjustment of the position of the manifold 55a with respect to the surface of the membrane 50. It is usually desirable to deposit fresh wash water upon the membrane 50 at several points along the length thereof. This may be accomplished by supporting additional manifolds 55a at different points in the diffusion column to either the left or right-hand frames 28 and 29. In Figure 6 the right-hand frame 29 is shown with two such manifolds 55a supported by brackets 56a which are secured to lugs 59a by screws 58a on the posts 30 of the frame 29. The additional manifolds 55a are provided with outlet pipes 60a, secured thereto by lock nuts 61a, and interchangeable cannulae 62a. The additional manifolds 55a are always positioned adjacent a combined membrane support and liquid stripping tube 45 as is shown in detail in Figure 10.

Figure 10:
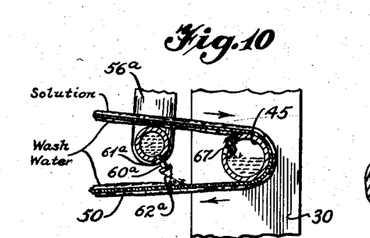
Figure 10 is an enlarged fragmentary end view in cross section showing a combined membrane support and means for removing liquid from a surface of the membrane; and, as well, the flowing films of solution upon the surfaces of the membrane.
Figure 11:
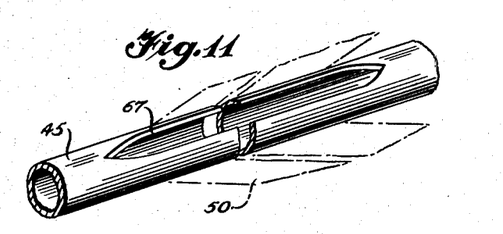
Figure 11 is a fragmentary broken perspective view showing the combined membrane support and means for removing liquid from the membrane which is shown in Figure 10.

The means for removing a liquid from a surface of the membrane comprises a tube 45 having a slot 67 formed in the sidewall thereof as is shown in Figure 11. These liquid stripping or removing tubes 45 are supported in either the frame 28 or 29 in a journal of the type shown in Figure 9. A tube 45 is employed adjacent each of the manifolds 55a for the purpose of withdrawing the wash liquid flowing, at that point, over the lower face of the membrane 50. The position of the edge of the slot 67 adjacent the surface of the membrane 50 from which the flowing film of liquid is to be removed is an important feature of this invention. This edge of the slot 67 is spaced from and positioned below the lower surface of the membrane 50 over which the film of liquid to be removed is flowing as is shown in Figure 10. It has been discovered that, when this relationship between surface of the membrane and the edge of the slot is maintained, there is no mingling of the flowing films of liquids on the upper and lower surfaces of the membrane 50 around the edges of the latter at the bends of the dialyzing membrane formed by the membrane supports. The flowing film of liquid passes over the edge of the slot 67 and into the tube 45. The liquid then passes from the tube 45 through one or more conduits 68 which may lead to the collecting basin at the base of the diffusion column. A tube 45 is also employed as the lowermost membrane support in the left-hand frame 28. Thus tube 45 collects the liquid which has been subjected to dialysis from the lower surface of the membrane 50 and the liquid collected is led by a conduit 69 to a collecting receptacle which is not shown.

Figures 16, 17:
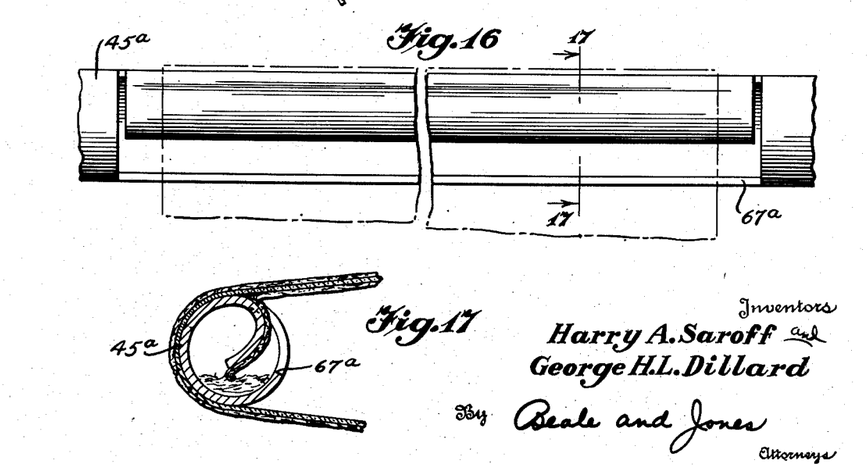
Figure 16 is an enlarged broken fragmentary top plan view of a modified form of a combined membrane support and means for removing the liquid from a surface of the membrane.
Figure 17 is an enlarged end view in cross section taken along line 17—17 of Figure 16 of the modified form of membrane support and liquid removing means shown in the latter figure.

A modified form of liquid collecting tube is shown in Figures 16 and 17 of the drawings. The modified form of tube 45a is provided with an opening 67a in the sidewall thereof and the edge of the opening which is positioned adjacent the lower surface of the membrane 50 over which the film of liquid to be removed is flowing is provided with an extension which is curved inwardly within the tube 45a. This curved extension of the edge of the opening 67a is shaped in the form of a modified helix.

Figure 14:
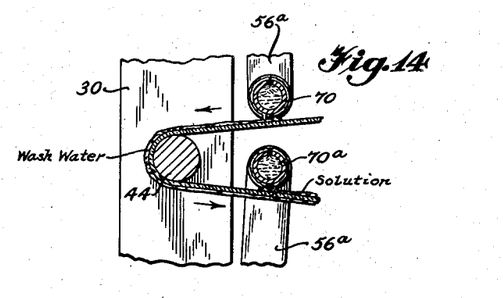
Figure 14 is an enlarged fragmentary view partly in cross section showing modified forms of manifolds for depositing liquids upon the upper and lower surfaces of a dialyzing membrane.
Figure 15:
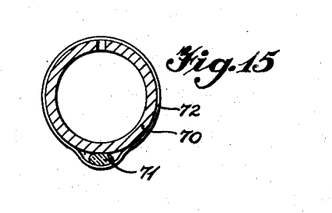
Figure 15 is an enlarged fragmentary view in cross section showing the modified form of manifold shown in Figure 14.

A modified form of manifold for depositing liquid upon the surfaces of the membrane 50 is shown in Figures 14 and 15. The manifold 70 is provided with a plurality of liquid outlets arranged along the top thereof. The liquid flowing from the manifold through the openings provided therein flows downwardly over both sides of the manifold. A distributor bar 71 is attached to the bottom of the manifold 70 by the bands 72. The bar 71, which may be formed of a plastic material, is positioned very close to the upper surface of the membrane 50, preferably about 0.01 mm. therefrom. The liquid flowing over the sides of the manifold 70 has become distributed to a certain extent and the bar 71 serves to complete this operation with the result that the liquid is deposited on the surface of the membrane 50 across the entire width thereof immediately. This modified form of manifold is not adapted for depositing a liquid to a lower surface of the membrane 50; and, in order to deposit a liquid upon such a surface, it is necessary to position the manifold 70 in advance of a membrane support above the bend formed thereby in the membrane. The arrangement of the manifolds adjacent the uppermost end of the left-hand frame 28 shown in Figure 6 may be modified as is shown in Figure 14. In this modified arrangement, employing the manifolds 70 for depositing the wash liquid, the portion of the membrane 50 in advance of the upper manifold 70 may be anchored to the diffusion column in any desired manner. A particular advantage of the arrangement shown in Figure 14 resides in the fact that the portion of the membrane 50 extending from beneath the membrane support is thoroughly wetted before the liquid to be subjected to dialysis is deposited upon the upper surface thereof with the result that no wrinkling of the membrane takes place at this point.

Figure 12:
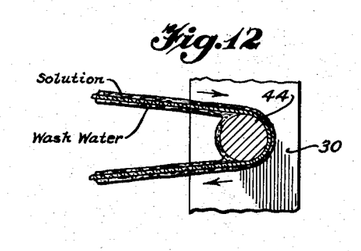
Figure 12 is an enlarged fragmentary end view of a portion of a membrane and a support therefor showing the films of liquid flowing on the upper and lower surfaces thereof.

In operating the diffusion column comprising this invention the desired rate of flow of the liquid to be processed from the manifold is determined. The rate of flow may be controlled by employing cannulae in the manifold having an orifice size which, in conjunction with a predetermined head of fluid, provide a rate of flow within the desired limits. The angle of the sections of the membrane 50 extending between the frames 28 and 29 with respect to the horizontal is selected in order to obtain the desired thickness of the film of liquid which flows freely over the membrane. This, in turn, determines the amount of turbulence which will be produced in the free flowing films of liquid. The desired angle of the membrane sections may be obtained by employing frames 28 and 29 wherein the vertical displacement of the membrane supports in one frame with respect to the vertical position of those in the other frame is such that the desired angle of the membrane sections with respect to the horizontal is provided. The diffusion column is then assembled and the dialyzing membrane 50 arranged therein in the vertically extending sinuous manner described. The solution to be processed is introduced into the reservoir 51 and the wash liquid is supplied to the reservoir 63. The liquid to be processed flows from the cannulae 62 in the manifold 55 and is deposited upon the upper surface of the first inclined section of the membrane 50. Simultaneously the wash liquid is deposited upon the lower surface of the membrane 50 adjacent the upper end of the frame 28. The liquids deposited upon the upper and lower surfaces of the membrane 50 move as free flowing films toward the uppermost membrane support in the right-hand frame 29. Each of these free flow films is composed of a laminar flowing portion adjacent the membrane and an outer turbulently flowing portion. When the upper and lower flowing films reach the first bend provided by the uppermost support in the frame 29 the liquids flow over the outside and around the inside of the bend as is shown in Figure 12. The liquids remain on their respective surfaces of the membrane 50 and do not flow over the edges thereof nor otherwise mingle. At any number of desired points in the diffusion column adjacent either of the frames 28 or 29 the wash liquid may be removed by employing a tube 45 or 45a as a membrane support and fresh wash liquid deposited on the membrane as is shown in Figure 10. The wash liquid may be collected if it is desired to recover a solution of the molecules which diffuse through the membrane 50. The liquid which has been processed may also be removed by employing a tube 45 or 45a as a membrane support as is shown at the lower end of the left-hand frame 28 in Figure 6. The latter liquid may also be collected and recovered. If desired, the wash liquid removed from the column adjacent the lower portion thereof may be redeposited upon the membrane at a point in the upper portion of the diffusion column. This is permissible because of the low concentration of diffused molecules in the wash liquid removed from the lower portion of the diffusion column.

The selection of the rate of flow of the liquid to be processed in operating either the diffusion unit shown in Figures 1 to 3 or the diffusion column described above must be made with the view to obtaining maximum efficiency. The rate of flow of the wash liquid is not especially critical and it is necessary only to maintain the rate below a point which overloads the membrane to such an extent that it sags. It has been discovered that, as the rate of flow of the liquid to be processed is increased, the percentage of the large molecules in solution therein which are recovered in the processed liquid increases. As the rate of flow is increased it has been ascertained that the ratio of the percentage of large molecules removed from the liquid being processed to the percentage of small molecules removed therefrom decreases. Therefore, the efficiency of separation diminishes if the rate of flow of the liquid being processed is increased. It will be apparent that optimum results will be obtained for any given solution of large and small molecules if a rate of flow thereof is employed at which maximum efficiency of separation is obtained and, as well, as high a percentage of large molecules as possible in the liquid processed is recovered. This relationship was demonstrated in a diffusion column having a membrane supported therein of an area of 1000 square inches employing a 1 to 1 molar ratio solution of sugar and salt. Three wash jets were employed which supplied water at a rate of flow of 150 ml./min. The following rates of flow of the above solution gave the results indicated:

| Rate of Flow, ml./min. | Sucrose Removed From Solution, Percent | Salt Removed From Solution, Percent | Ratio of Percent Sucrose Removed to Percent Salt Removed |
|---|---|---|---|
| 6.9 | 58 | 95 | 0.61 |
| 12.4 | 44 | 89 | 0.49 |
| 22 | 30 | 77 | 0.39 |
| 33 | 23 | 63 | 0.37 |
| 35 | 20 | 60 | 0.33 |
| 45 | 17 | 52 | 0.33 |

The features of this invention may, obviously, be embodied in forms of equipment not specifically disclosed herein. Such other equipment may be devised readily by persons skilled in this art and to whom the fundamental principles herein disclosed are made available. Many forms of apparatus may be constructed wherein a dialyzing membrane is supported to provide flat, plane surfaces and means are provided whereby a liquid containing dissolved molecules and a wash liquid may be deposited on opposite surfaces of the membrane and passed thereover in the form of thin freely flowing films. All equipment capable of carrying out diffusion processes in the manner described is intended to fall within the scope of the appended claims.

We claim:

1. A diffusion column comprising a spaced pair of upwardly extending supporting members, a plurality of horizontally disposed membrane supporting members mounted on each of said supporting members, the membrane supporting members in one of said supporting members being vertically displaced with respect to the adjacent opposite membrane supporting members in the other supporting member, a dialyzing membrane mounted upon the membrane supports of each of said supporting members, said membrane extending transversely of said diffusion column alternately between adjacent opposite membrane supporting members throughout said column whereby said membrane occupies a vertically disposed sinuous path, means for depositing a liquid containing dissolved molecules on one of the surfaces of said membrane adjacent the uppermost end thereof, means for depositing a wash liquid to the other surface of said membrane adjacent the uppermost end thereof, means for removing the liquid containing dissolved molecules from the surface of said membrane mounted on one of said supporting members, and means for removing wash liquid from the other surface of said membrane mounted on one of said supporting members.

2. A diffusion apparatus as set forth in claim 1 characterized in that the means for depositing liquid upon a surface of the membrane comprises a manifold provided with liquid outlets in the top thereof, a fluid distributing bar mounted on the bottom of said manifold and means for securing said distributor bar to said manifold.

3. A diffusion column as set forth in claim 1 characterized in that said upwardly extending supporting members comprise a spaced pair of vertically disposed frames, a supporting means immovably secured to one of said frames, and a supporting means for the other of said frames, said last named frame being laterally moveable toward and away from the other of said frames whereby the tension upon the sinuously disposed dialyzing membrane, supported by said frames may be varied.

4. A diffusion column as set forth in claim 3 characterized in that said second named supporting means comprises at least one member mounted on each of the adjacent opposed sides of said frames and extends transversely therebetween, each of said members being immovably secured to one of said frames and movable with respect to the other of said frames, and means mounted on each of said transversely extending members for exerting pressure between said frames to cause one of said frames to move away from the other of said frames whereby tension may be placed on the sinuously disposed dialyzing membrane supported by said frames.

5. A diffusion column as set forth in claim 1 characterized in that a plurality of journal members are mounted on each of said upwardly extending supporting members, each of said membrane supporting members being mounted in said journal members whereby said membrane supporting members may rotate when tension is applied to the dialyzing membrane supported thereupon.

6. A diffusion column as set forth in claim 5 characterized in that the membrane supporting member at the top of one of said supporting members and the membrane supporting member at the bottom of one of said supporting members are each provided with means for rotating said members, and locking means mounted on said upwardly extending supporting members adjacent each of said membrane supporting member rotating means for locking said membrane support members to prevent rotation thereof.

7. A diffusion column as set forth in claim 1 characterized in that each of said upwardly extending supporting members is provided with at least one dialyzing membrane support comprising a tube having a horizontally disposed elongated opening in the sidewall thereof for removing liquid from the lower surface of the membrane supported thereon, the edge of said opening adjacent the surface of the membrane from which the liquid is to be removed being spaced from and positioned below said surface of said membrane.

8. A diffusion column as set forth in claim 7 characterized in that the edge of the opening in said tube adjacent the surface of the membrane from which the liquid is to be removed is provided with an extension in form of a modified helix which extends within said tube.

References Cited in the file of this patent

UNITED STATES PATENTS

| Number | Name | Date |
|---|---|---|
| 2,247,143 | Bailey | June 24, 1941 |